Figure 1:
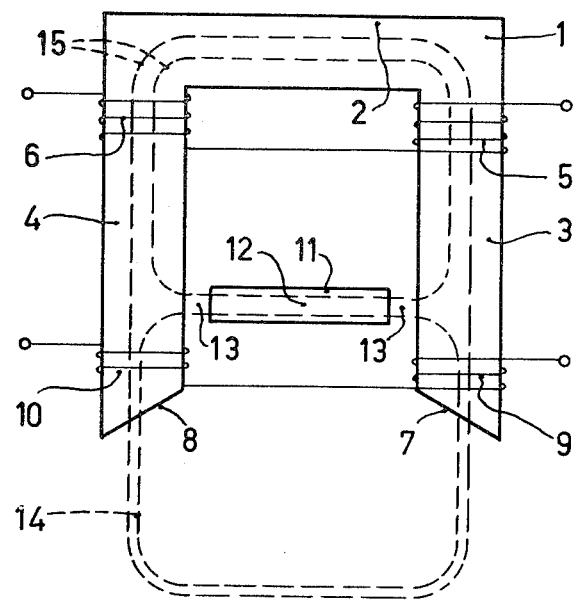

United States Patent [19]

Brockmann

[11] 3,935,506

[45] Jan. 27, 1976

[54] DEVICE FOR RADIAL, STATIC AND DYNAMIC CONVERGENCE OF ELECTRON BEAMS IN A COLOUR TELEVISION DISPLAY TUBE

[75] Inventor: Hans-Jürgen Brockmann, Halstenbek, Germany

[73] Assignee: U.S. Philips Corporation, New York, N.Y.

[22] Filed: Mar. 3, 1972

[21] Appl. No.: 231,548

[30] Foreign Application Priority Data
Mar. 13, 1971  Germany............................ 2112163

[52] U.S. Cl................................ 315/370; 335/213
[51] Int. Cl.².......................................... H01J 29/56
[58] Field of Search ........ 315/13 C, 13 CG, 27 GD, 315/27 XY, 370; 335/213

[56] References Cited
UNITED STATES PATENTS

| | | | |
|---|---|---|---|
| 2,880,339 | 3/1959 | Kroger | 315/13 C |
| 3,422,303 | 1/1969 | Chipman | 315/13 C |
| 3,560,793 | 2/1971 | Payen | 315/13 C |
| 3,688,156 | 8/1972 | Utsunomiya et al. | 315/13 C X |
| 3,717,788 | 2/1973 | Rogers | 315/13 C |

FOREIGN PATENTS OR APPLICATIONS

| | | | |
|---|---|---|---|
| 1,119,420 | 12/1961 | Germany | 315/27 GD |

*Primary Examiner*—Samuel Feinberg
*Assistant Examiner*—Peter A. Nelson
*Attorney, Agent, or Firm*—Frank R. Trifari; Henry I. Steckler

[57] ABSTRACT

Thus far a substantial amount of energy was required for the two coils for the dynamic line frequency convergence in a device for radial, static and dynamic convergence. So as to improve this situation, a magnetic bridge is arranged between the two legs of a U-shaped electromagnet forming part of the convergence device, the magnetic resistance of this bridge being comparatively small in the magnetic circuit of the coils for the dynamic line frequency convergence and comparatively large in the magnetic circuit of the coils for the static and field frequency convergence.

7 Claims, 5 Drawing Figures

3,935,506

DEVICE FOR RADIAL, STATIC AND DYNAMIC CONVERGENCE OF ELECTRON BEAMS IN A COLOUR TELEVISION DISPLAY TUBE

The invention relates to a device for radial, static and dynamic convergence of electron beams in a colour television display tube, adapted to be mounted about the neck of the display tube approximately at the level of the foremost end of the electron guns provided in the display tube for generating the electron beams, the said device comprising U-shaped electromagnets, each of which is capable of generating a magnetic field in the area of one of the electron beams via associated pole shoes provided in the display tube, variation of said field causing a radial displacement of the relevant electron beam, i.e. towards the axis of the display tube or away from that axis, said electromagnets consisting of a ferromagnetic U-shaped core having two substantially parallel legs which are connected by a yoke, each of said legs being enveloped by a coil, provided near the yoke, for static and possibly field frequency dynamic convergence, and also by a coil, provided near the free end of the leg, for dynamic line frequency and possibly field frequency convergence.

The German Auslegeschrift 1,290,174 describes which different convergence devices are required for correctly positioning the electron beams in a colour television display tube. The present invention relates to the device for the radial, static and dynamic convergence as set forth. In devices commonly used thus far, the magnetic resistance in the magnetic circuit of both coils for the dynamic line frequency convergence was found to be very large. As a result, a large magnetic energy (apparent power) is required for an effective adjustment of the convergence by means of these two coils. This is because the magnetic circuit for these two coils is mainly closed only by the stray field between the two legs of the U-shaped core.

In order to eliminate this drawback, it is known to construct the legs of the U-shaped core to be longer, so that the relevant magnetic circuit is somewhat improved in that the magnetic stray flux behind the coils is increased. However, this step also increases the stray field in the magnetic circuit for the two coils for the static and field frequency convergence, which also increases the cross-talk between the magnetic circuits associated with different electron guns.

The invention has for its object to provide a substantial reduction of the largest resistance in the magnetic circuit of the coils for the dynamic line frequency convergence, without the magnetic circuit of the coils for the static and field frequency convergence being essentially affected, and without the cross-talk being increased.

In order to achieve this object, the device according to the invention is characterized in that a magnetic bridge is provided between the portions of the two legs which are bound by the coils for the static and field frequency convergence on the one side and by the coils for the line frequency convergence on the other side, said bridge forming a comparatively small magnetic resistance in the magnetic circuit of the coils for the dynamic line frequency convergence, but having a comparatively large magnetic resistance with respect to the internal magnetic resistance of the coil system for the static and field frequency convergence.

To this end, the magnetic bridge may consist of an oblong soft-iron body which is provided between the two legs of the core, approximately parallel to the yoke, an air gap being present between at least one of the ends of the body and the nearest leg.

The magnetic bridge may also consist of at least one oblong soft-iron body which is provided adjacent to the two legs, approximately parallel to the yoke, the length of the body being at least equal to the distance between the two legs, at least one air gap being present between the body and the core. In both cases the position of the soft-iron body is preferably adjustable.

An advantage of the device according to the invention is that, due to the reduction of the magnetic resistance in the magnetic circuit of the coils for the dynamic line frequency convergence, the sensitivity of these coils is substantially increased. For the same magnetic deflection of an electron beam, now only half the magnetic energy (apparent power) is required. Consequently, the steps to be taken in the associated electronic circuit are substantially simplified and use can possibly be made of components with a lower permissible load. Due to the increased sensitivity of the coils on the ends of the legs of the U-core, used thus far only for the line frequency radial convergence, these coils can also be used for the field frequency radial convergence, for which purpose a current, obtained by additive combining of line and field frequency convergence currents, is fed through these coils, for example, each time from a transistor output stage for the red, the green and the blue radial convergence system.

In the foregoing some preferred constructions for the magnetic bridge were described. Within the scope of the invention, however, bridge bodies can also be used which are made, for example, of a mixture of soft-iron and a synthetic resin material.

The adjustability of the bridge body offers, for example, the possibility of varying the inductance of the coils for the static and field frequency convergence, the resistance of the magnetic circuit for line frequency convergence remaining substantially the same, so that in given circuits adjustment of the desired shape of the (usually more or less parabolic, 50-Hz) convergence current is possible since the relation between inductance and resistance determines the shape of the curve of, for example, a left-hand parabolic branch which decreases exponentially. When these steps are taken, however, it is to be taken into account that the magnetic resistance in the magnetic circuit for the coils of the static and field frequency convergence must remain large at the area of the bridge in relation to the internal magnetic resistance of this coil system, i.e. that the magnetic bridge resistance between the two U-shaped legs must be large with respect to the magnetic resistance which is formed by the two legs and the yoke of the U-shaped core of the electromagnet.

Figure 2:
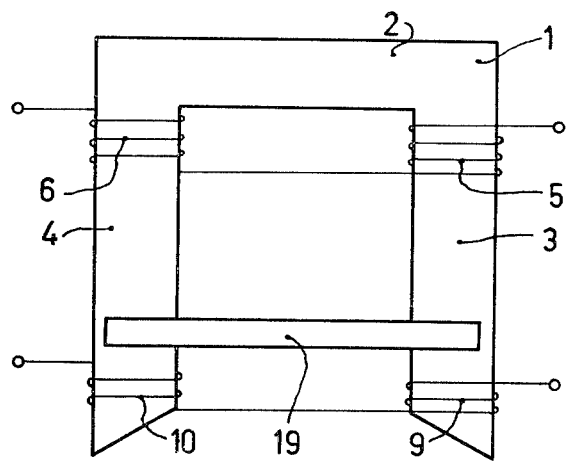
Figure 3:
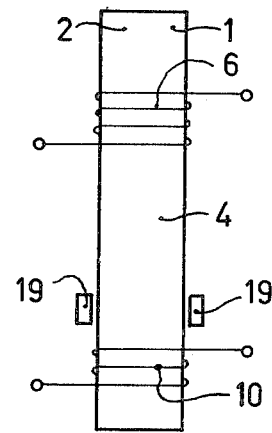
Figure 4:
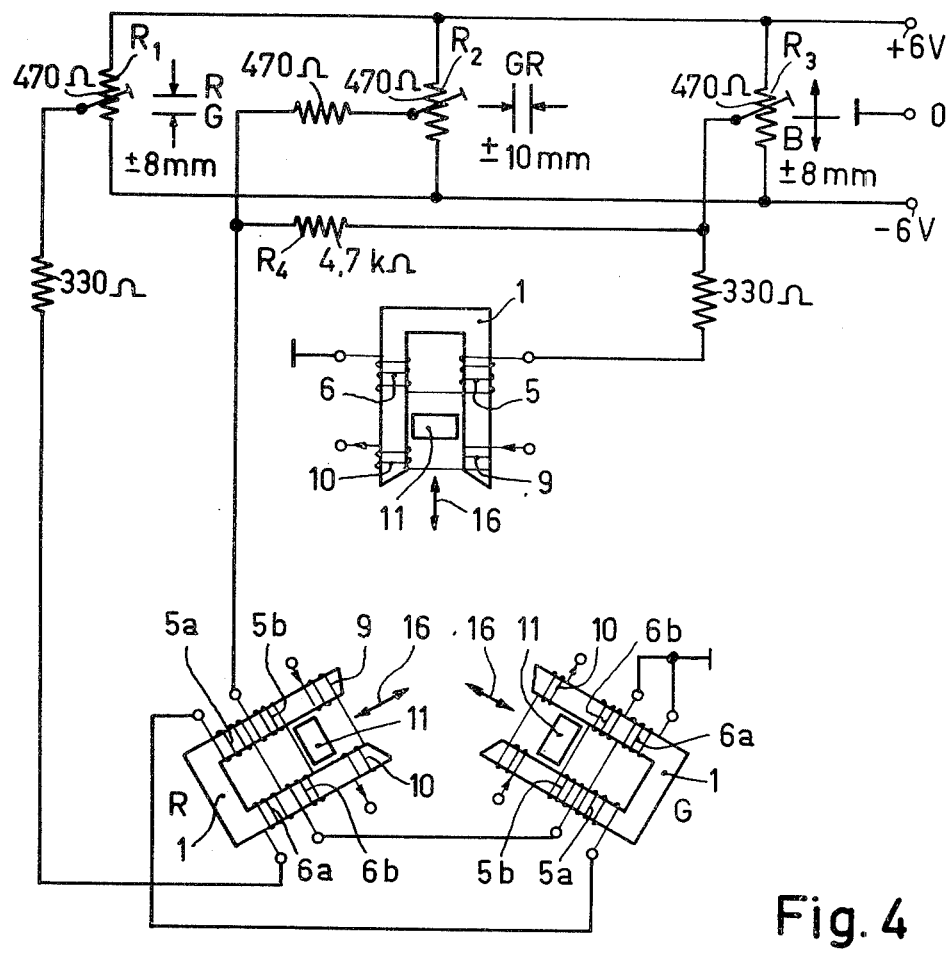
Figure 5:
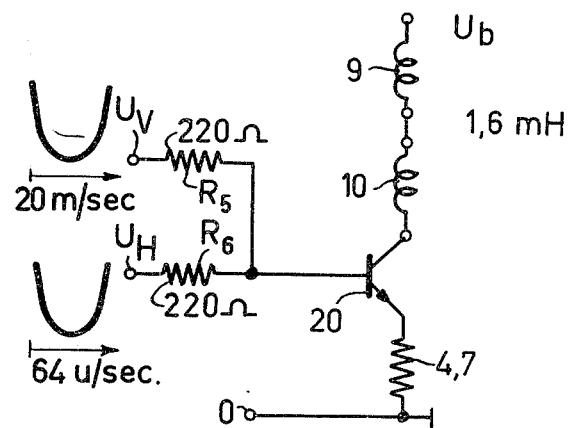

In order that the invention may be readily carried into effect, some embodiments thereof will now be described in detail, by way of example, with reference to the accompanying diagrammatic drawings, in which:

FIG. 1 shows an electromagnet for a device according to the invention, having a soft-iron body between the two legs of the U-shaped core of the electromagnet, FIG. 2 shows an electromagnet for another device according to the invention, having a soft-iron bridge body which is provided adjacent to the two legs of the U-shaped core of the electromagnet, FIG. 3 shows an electromagnet resembling that shown in FIG. 2 and having two soft-iron bridge bodies arranged adjacent to the two legs of the core, FIG. 4 shows the relative position of three U-shaped cores of electromagnets which together form a convergence unit for the radial, static and dynamic convergence, in conjunction with the associated circuit for the static convergence, and FIG. 5 shows a transistor output stage for supplying convergence currents to a pair of coils.

FIG. 1 shows an electromagnet having a U-shaped core, consisting of a yoke 2 and two parallel legs 3 and 4 which are enveloped in the vicinity of the yoke 2 by coils 5 and 6 for static convergence, it being possible to use said coils also for field frequency dynamic convergence for which purpose they are than supplied with parabolic currents having a frequency of 50 Hz. In the vicinity of the ends 7 and 8 of the legs 3 and 4, coils 9 and 10 are arranged about the legs for the dynamic line frequency convergence. If desired, it is also possible to supply the 50-Hz parabolic currents for the field frequency convergence via these two coils 9 and 10. Situated between the two legs 3 and 4 is a magnetic bridge consisting of an oblong soft-iron body 11. For adjusting purposes, this body is preferably arranged to be pivotable about a pivot 12. If desired, it may also be arranged to be displaceable in its longitudinal direction. Provided between the body 11 and the leg 3 is an air gap 13, a similar air gap being also present between the leg 4 and the body 11. The magnetic circuit 14 (denoted by a broken line) of the coils 9 and 10 is closed over an important portion by the body 11, because this body 11 reduces (at the area where it is used) the magnetic tension drop which would occur if this body were not provided.

The flux generated by the coils 5 and 6, denoted in FIG. 1 by broken lines at 15, flows partly through the body 11 which also acts as a magnetic shunt for this flux, and partly to the area of an electron beam (not shown) via the ends 7 and 8 of the legs 3 and 4. The magnetic resistance which is formed by the body 11 and the two air gaps 13 is large with respect to the magnetic resistance in the path along the leg 4, the yoke 2 and the leg 3, so that the magnetic field generated by the coils 5 and 6 for static and field frequency convergence is still strong enough at the ends of the legs.

The drawbacks of the devices known thus far were that the magnetic flux, generated due to the current through the coils 9 and 10, was also embraced by the coils 5 and 6. As a result, in accordance with Lenz's law a counter-field was formed which had the effect that, due to the very low frequency of the current in the coils 5 and 6 with respect to the line frequency, the magnetic circuit of the coils 9 and 10 was interrupted at this area. Consequently, this circuit was virtually not loaded from a magnetic point of view. The effect was the same as if the legs of the core were cut off before the beginning of the coils 5 and 6, viewed from the coils 9 and 10. Consequently, according to the insight on which the invention is based, the body 11 had to be introduced before these "interruptions".

FIG. 2 shows an electromagnet which resembles that shown in FIG. 1, but in this case the soft-iron body acting as the magnetic bridge is formed by a bar 19, the length of which is larger than the distance between the two legs 3 and 4 of the U-shaped core 1. The bar 19 is arranged to be adjacent to the legs, parallel to the yoke 2. The magnetic circuits are subject to the same conditions as are applicable for providing the body 11 shown in FIG. 1. The remarks as regards adjustability of the position of the body of FIG. 1 also apply to that shown in FIG. 2.

FIG. 3 is a side view of a U-shaped core 1. In this case two soft-iron bars 19 are provided to form the bridge, the said bars being arranged at a small distance from and adjacent to the legs 3 and 4 and corresponding to the bar 19 shown in FIG. 2.

FIG. 4 is a front view of three electromagnets having U-shaped cores 1, i.e. viewed from the screen side of a colour television display tube, said electromagnets together forming a device for radial convergence. The upper electromagnet is for the colour blue (B), the right-hand magnet is for green (G) and the left-hand electromagnet is for red (R). The deflections for the static convergence and also for the dynamic convergence are in principle effected in the radial direction, as is indicated by the arrows 16. The upper portion of the Figure shows a circuit diagram of a circuit for the static convergence. The circuit is composed of three parallel-connected 470-ohm resistors $R_1$, $R_2$, $R_3$, each resistor having an adjustable tapping so as to supply a direct voltage to the convergence device.

The circuit is special in that the coils 5 and 6 of the U-shaped cores 1 for red and green are divided into the sections 5a, 5b, 6a and 6b. The tapping of the resistor $R_1$ is connected to a series-connection of the sections 6a (red), 5a (red), 5a (green) and 6a (green), and the tapping of the resistor $R_2$ is connected to a series-connection of the sections 5b (red), 6b (red), 5b (green) and 6b (green). The magnetic circuits of these coil sections extend similarly to those of the coils 5 and 6. The connection of the coils shown here offers the advantage that the convergence can be very readily adjusted. When using an orthogonal raster pattern on the display screen for the convergence adjustment, an apparent horizontal and vertical mutual adjustment of the red and the green raster pattern is observed instead of radial electron beam deflections. In order to make the red and the green raster pattern coincide in the vertical direction, the tapping of $R_1$ is adjusted such that the current through the sections 6a and 5a of the red system and 5a and 6a of the green system varies. The adjustment in the horizontal direction is effected in an analogous manner by means of $R_2$.

Like the coils 5 and 6 for the static (and field frequency) convergence, the coils 9 and 10 for the line frequency convergence can also be subdivided into sections, For the electrical compensation of the crosstalk, the blue and red convergence units are connected via a 4.7 kohm resistor $R_4$. For the current supply of the coils 9 and 10, it is very advantagous to use an output stage comprising a transistor 20 the coils being connected in the collector lead thereof, (see FIG. 5). An output stage transistor can each time be used for red, green and blue, it being possible to use an output stage of this kind not only for the line frequency convergence but also for the field frequency convergence. To this end, the line frequency and field frequency convergence currents may be added by means of two 220-ohm resistors $R_5$ and $R_6$.

What is claimed is:

1. A television convergence device comprising a substantially U shaped ferromagnetic core have two substantially parallel legs and a yoke coupled to said legs; a pair of static convergence coils disposed about said legs respectively proximate said yoke; a pair of dynamic line frequency convergence coils disposed about said legs respectively proximate the free ends thereof; and means for providing a small magnetic resistance with respect to the line frequency magnetic circuit and a large resistance with respect to the internal magnetic resistance of the static magnetic circuit, said providing means comprising a ferro magnetic bridge disposed proximate said two legs and between said static coils on one side thereof and said dynamic coils on the other side thereof.

2. A device as claimed in claim 1 wherein said bridge comprises a rectangular soft iron body disposed between said legs substantially parallel to said yoke and defining an air gap between at least one of said legs and the nearest end of said body.

3. A device as claimed in claim 1 wherein said bridge comprises a rectangular soft iron body disposed adjacent said legs substantially parallel to said yoke and having a length at least equal to the distance between said legs and defining at least one air gap between said body and said core.

4. A device as claimed in claim 1 wherein said bridge comprises an adjustable bridge.

5. A device as claimed in claim 1 wherein said static convergence coil also comprises a field frequency dynamic convergence coil.

6. A device as claimed in claim 1 wherein said line frequency convergence coil also comprises a field frequency convergence coil.

7. A device as claimed in claim 1 wherein said bridge comprises a magnetically soft material.

* * * * *